United States Patent [19]
Behrens et al.

[11] Patent Number: 5,562,124
[45] Date of Patent: Oct. 8, 1996

[54] STEERING CONTROL VALVE WITH DIFFERENT SIZE FLOW GAPS FOR NOISE SUPPRESSION

[75] Inventors: Hermann W. Behrens, Rancho Palos Verdes; George M. Harpole, San Pedro; Jane M.-C. Lin, Rancho Palos Verdes; Michael F. Wolff, Torrance, all of Calif.; Wendell L. Gilbert, Pleasant Shade, Tenn.

[73] Assignee: TRW Inc., Lyndhurst, Ohio

[21] Appl. No.: 391,236

[22] Filed: Feb. 21, 1995

[51] Int. Cl.[6] .............................. F15B 13/04; F15B 9/10
[52] U.S. Cl. .................... 137/625.23; 91/375 A; 137/625.24
[58] Field of Search .................... 91/375 A; 137/625.23, 137/625.24

[56] References Cited

U.S. PATENT DOCUMENTS

| | | |
|---|---|---|
| 4,335,749 | 6/1982 | Walter . |
| 4,924,910 | 5/1990 | Tabata et al. . |
| 5,048,630 | 9/1991 | Schaffer . |
| 5,207,244 | 5/1993 | Behrens et al. . |
| 5,244,012 | 9/1993 | Tabata et al. . |
| 5,259,413 | 11/1993 | Harpole et al. . |

FOREIGN PATENT DOCUMENTS 59-58278  4/1984  Japan .................. 137/625.23

*Primary Examiner*—Gerald A. Michalsky
*Attorney, Agent, or Firm*—Tarolli, Sundheim, Covell, Tummino & Szabo

[57] ABSTRACT

A valve (10) for controlling flow of hydraulic fluid. The valve (10) has first and second valve members (80, 82) which have a plurality of lands and grooves. The valve members (80, 82) are relatively movable from a neutral position to a displaced position in which surface segments (202, 226, 208, 218) of respective pairs of lands overlap to form flow gaps (232, 234) for restricting flow of fluid between respective pairs of grooves. At least one (234) of the flow gaps is divergent by having a cross-sectional flow area which increases along a direction of fluid flow and at least one (232) of the flow gaps is convergent by having a cross-sectional flow area which decreases along a direction of fluid flow. The flow gaps (232, 234) have minimum cross-sectional flow areas (A, B) defined by the surface segments. The flow gaps (232, 234) are sized such that the minimum cross-sectional flow area (A) of the convergent flow gap (232) is larger than the minimum cross-sectional flow area (B) of the divergent flow gap (234) for suppressing valve noise.

20 Claims, 4 Drawing Sheets

5,562,124

STEERING CONTROL VALVE WITH DIFFERENT SIZE FLOW GAPS FOR NOISE SUPPRESSION

BACKGROUND OF THE INVENTION

The present invention relates to a valve for controlling flow of hydraulic fluid. Specifically, the valve is a rotary valve used to control the flow of hydraulic fluid from a pump to a power steering motor.

A known power steering control valve for controlling flow of hydraulic fluid from a fixed displacement pump to a power steering motor includes a valve sleeve having a generally cylindrical bore therein and a generally cylindrical valve core rotatably mounted therein. Each of the core and sleeve has a plurality of lands and grooves that cooperate to regulate fluid pressure within the valve and control flow from the pump to the power steering motor.

When the spool and sleeve are in a neutral position, fluid is communicated generally equally to opposite chambers of the power steering motor. When the core and sleeve are relatively rotated from the neutral position, fluid flow is variably restricted. Restriction of the fluid flow causes pressurized fluid to be delivered to one of the chambers of the power steering motor to cause motor actuation.

The restriction is provided by the cooperation of lands on the core and sleeve which define flow orifices of variable size. Relative rotation between the core and the sleeve varies the size of the flow orifices. Upon relative rotation from the neutral position to a displaced position, certain pairs of lands on the core and sleeve radially overlap to restrict the associated flow orifice to only the size of a gap between end face surfaces of the respective pairs of lands. Due to a high volume of hydraulic fluid flow from the pump and pressure changes (drops), noise is generated. The noise includes noise due to cavitation of hydraulic fluid flowing through the flow gaps.

SUMMARY OF THE INVENTION

The present invention is directed to an improved valve for controlling flow of hydraulic fluid. The valve includes first and second valve members which have a plurality of lands and grooves. The valve members are relatively movable from a neutral position to a displaced position in which surface segments of respective pairs of lands overlap to form flow gaps for restricting flow of fluid between respective pairs of grooves. At least one of the flow gaps is divergent by having a cross-sectional flow area which increases along a direction of fluid flow therethrough. At least one of said flow gaps is convergent by having a cross-sectional flow area which decreases along a direction of fluid flow therethrough.

Each flow gap has a minimum cross-sectional flow area which is defined by the surface segments. The flow gaps are sized such that the minimum cross-sectional flow area of the convergent flow gap is larger than the minimum cross-sectional flow area of the divergent flow gap. This difference is size, as defined by the surfaces, functions as a regulation means for regulating the fluid volume flow rates through the divergent flow gap and the convergent flow gap. The fluid volume flow rate through the convergent flow gap is greater than the fluid volume flow rate through the divergent flow gap for suppressing valve noise.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
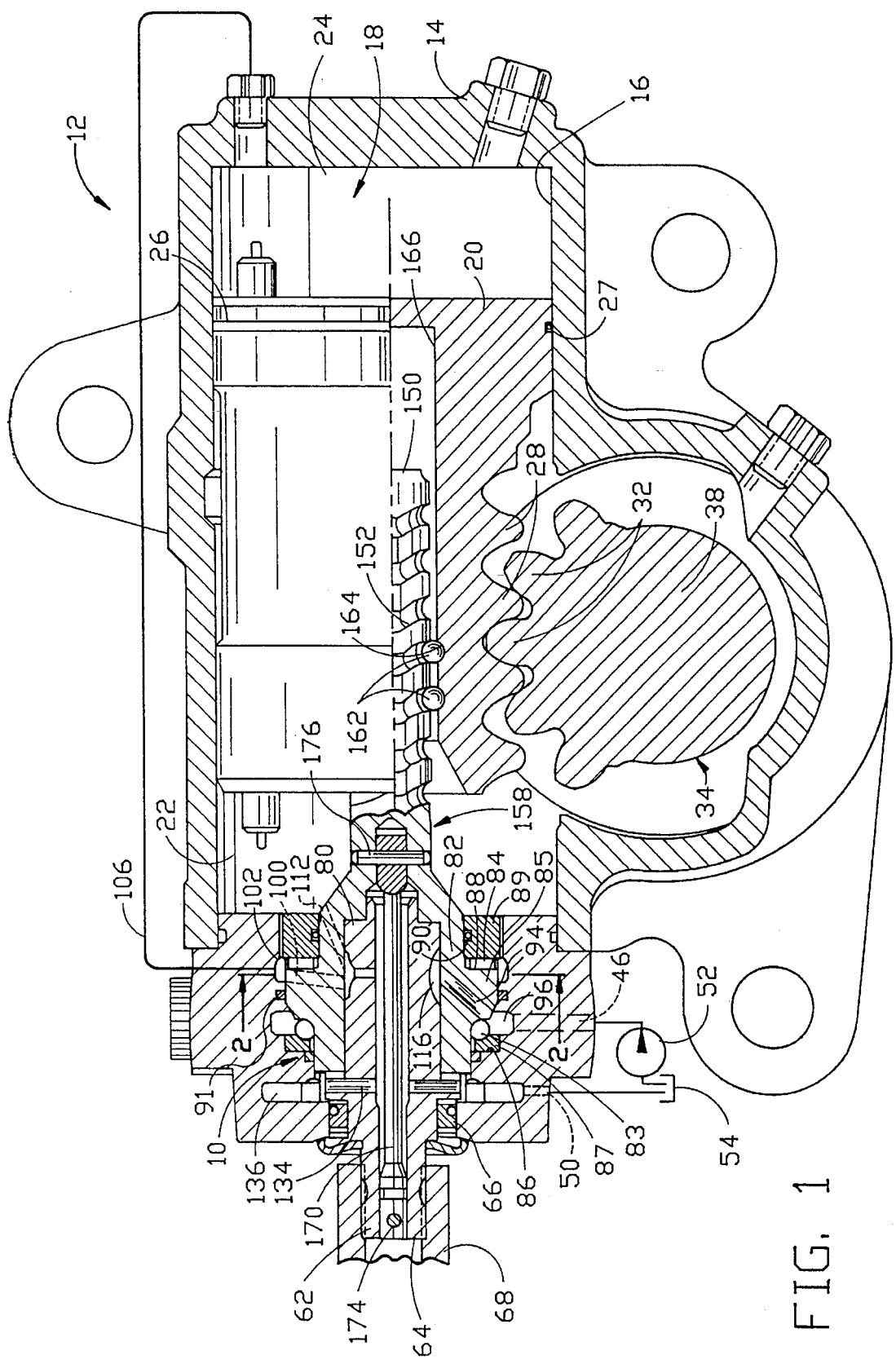
FIG. 1 is a longitudinal cross-sectional view of a power steering gear with a valve which embodies the present invention.

A fluid control valve of the present invention may be used to control fluid flow associated with mechanisms of a variety of constructions and uses. Preferably, the control valve 10 (FIG. 1) is utilized in a power steering gear 12 which provides power assistance for turning dirigible wheels (not shown) of a vehicle (not shown) in opposite directions to effect steering of the vehicle. The preferred power steering gear is a model TAS Integral Power Steering Gear manufactured and marketed by TRW Inc., Ross Gear Division of Lafayette, Ind., and identified as TAS40, TAS55 or TAS65. The power steering gear 12 includes a housing 14 having an inner cylindrical surface 16 defining a chamber 18. A piston 20 (shown partially in section) divides the chamber 18 into opposite chamber portions 22 and 24 located at opposite ends of the piston 20. An O-ring 26 carried in a groove 27 in the piston 20 provides a fluid seal between the chamber portions 22 and 24.

A series of rack teeth 28 are formed on the periphery of the piston 20. The rack teeth 28 mesh with teeth 32 formed on a sector gear 34. The sector gear 34 is fixed on an output shaft 38 which extends outwardly from the steering gear 12 through an opening (not shown) in the housing 14. The output shaft 38 is typically connected to a pitman arm (not shown) which in turn is connected to a mechanical steering linkage (not shown) of the vehicle. Thus, as the piston 20 moves in the chamber 18, the sector gear 34 and output shaft 38 are rotated to operate the steering linkage as will be understood by those skilled in the art.

The housing 14 includes a fluid inlet port 46 and a fluid return port 50. The inlet port 46 and the return port 50 are adapted to be connected in fluid communication with hydraulic circuitry (schematically illustrated) including a power steering pump 52 and a fluid reservoir 54. The control valve 10 is operable to direct pressurized fluid from the inlet port 46 to one of the chamber portions 22 and 24. Fluid from the other of the chamber portions 22 and 24 is simultaneously directed by the control valve 10 to the return port 50 which is connected with the fluid reservoir 54.

The control valve 10 is actuated by a rotatable shaft 62. The shaft 62 is supported for rotation relative to the housing 14 via a bearing member 66. An outer end portion 64 of the shaft 62 is splined for receiving a portion of a shaft 68 thereon. The shaft 68 is connected with a steering wheel (not shown) which is manually turned by the operator of the vehicle to effect steering of the vehicle.

Figure 2:
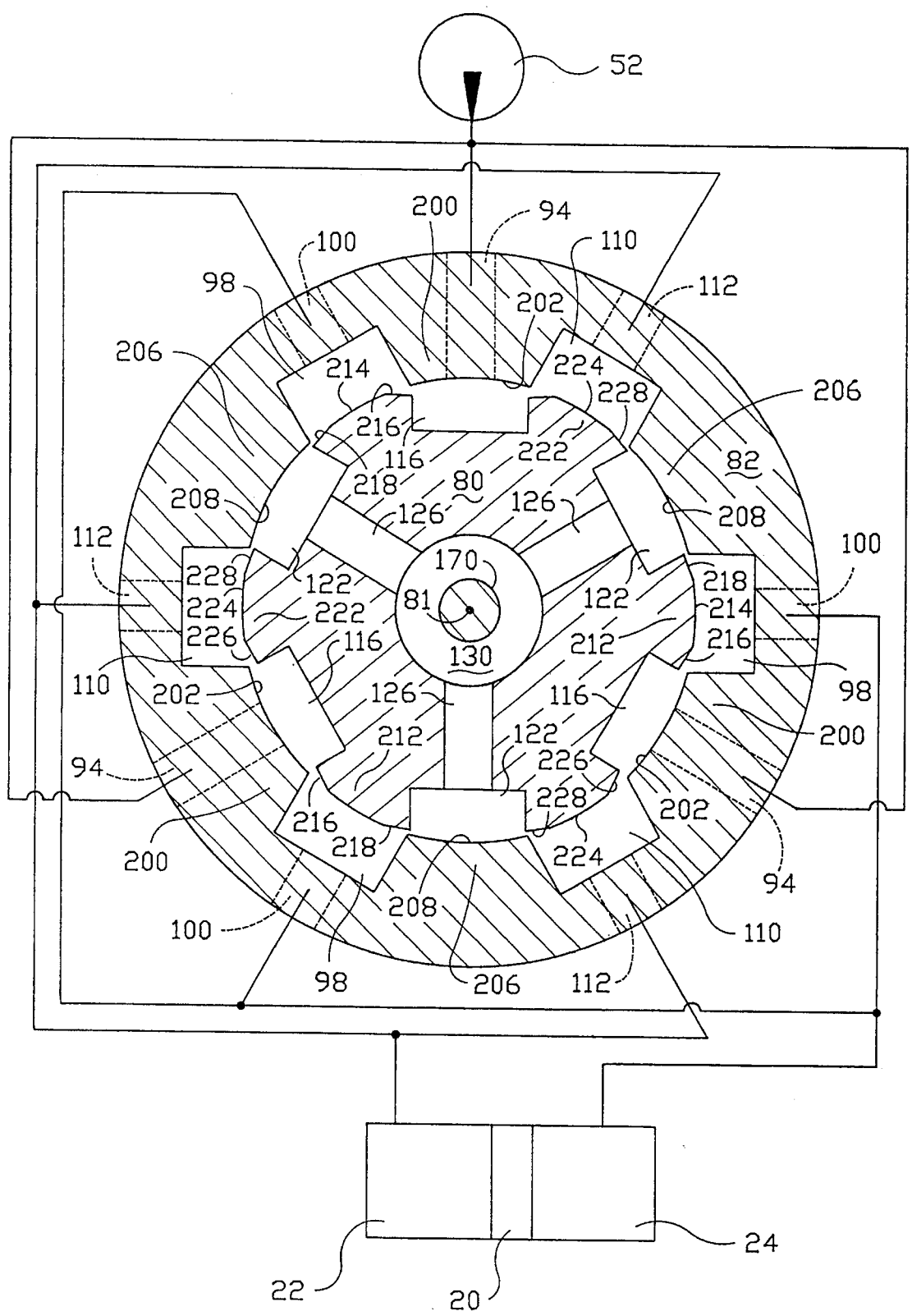
FIG. 2 is a cross-sectional view of a portion of the valve taken approximately along line 2—2 of FIG. 1 with schematic representations.

The control valve 10 includes a valve core 80 and a hollow valve sleeve 82. The valve core 80 is located coaxially within the valve sleeve 82 and is rotatable relative to the valve sleeve 82 about a common axis 81 (FIG. 2). The valve sleeve 82 (FIG. 1) is supported for rotation by bearings 83 and 84 located between the valve sleeve 82 and the housing 14. The bearing 83 is located between an annular projecting portion 85 of the valve sleeve 82 and a radial wall 86 of the housing 14. Also, a seal ring 87 is located between the outer surface of the valve sleeve 82 and the housing 14.

The bearing 84 is a thrust bearing and is located between a radial surface 88 of the annular projecting portion 85 of the valve sleeve 82 and a retaining nut 89. The nut 89 is threaded into the housing 14 and holds the control valve 10 within the housing 14. A seal ring 90 is located between the nut 89 and an outer surface of the valve sleeve 82. Another seal 91 is disposed in a groove in the housing 14.

The valve sleeve 82 (FIG. 2) has three radially directed passages 94 extending from its outer periphery to its inner periphery. The passages 94 are spaced 120° apart about the valve sleeve 82. The passages 94 communicate with an annulus 96 (FIG. 1) in the housing 14. The annulus 96, in turn, is connected with the inlet port 46, and is thus subjected to the fluid pressure from the pump 52.

The valve sleeve 82 has three axially extending grooves 98 (FIG. 2) which are equally spaced around the inner periphery of the valve sleeve 82. Each of the grooves 98 communicate with a respective radially extending passage 100. The passages 100 are spaced 120° apart about the valve sleeve 82. The passages 100 (FIG. 1 shows only one passage 100, in phantom) communicate with an annulus 102 in the housing 14. The annulus 102 communicates with a housing passage 106 (shown schematically) which, in turn, communicates with the chamber portion 24.

The valve sleeve 82 (FIG. 2) includes three axially extending grooves 110 which are equally spaced about the inner periphery thereof. Each of the grooves 110 communicate with a respective passage 112. The passages 112 are spaced 120° apart about the valve sleeve 82. The passages 112 (FIG. 1 shows only one passage 112, in phantom) communicate with the chamber portion 22.

The valve core 80 has an elongated cylindrical configuration and is integrally formed as one piece with the shaft 62. The valve core 80 has three axially extending grooves 116 (FIG. 2) in its outer periphery. The grooves 116 are equally spaced 120° apart about the outer periphery of the valve core 80 and are in direct fluid communication with the passages 94 in the valve sleeve 82. The extent of the grooves 116 around the outer periphery of the valve core 80 is such that each of the grooves 116 communicates equally with respective grooves 98 and 110 when the valve core 80 is in a centered or neutral position relative to the valve sleeve 82 (as shown in FIG. 2).

Also equally spaced about the outer periphery of the valve core 80 are axially extending grooves 122. The extent of the grooves 122 around the outer circumference of the valve core 80 is such that each of the grooves 122 communicates equally with respective grooves 98 and 110 when the valve core 80 is in the centered or neutral position. Each of the grooves 122 is directly connected with a respective passage 126 which extends from each groove 122 into an internal passage 130 of the valve core 80. The internal passage 130 of the valve core 80 is connected with a plurality (four) of radially extending passages 134 (FIG. 1, only two shown) which extend through the valve core 80. The radially extending passages 134 communicate with an annulus 136 in the housing 14. The annulus 136, in turn, communicates with the return port 50 in the housing 14.

The valve sleeve 82 of the steering gear 10 is integrally formed with a follow-up member 150 which has a screw thread portion 152 formed in its outer periphery. The valve sleeve 82 and the follow-up member 150 form an integral one-piece unit 158. A plurality of balls 162 are located in the screw thread portion 152. The balls 162 are also located in an internally threaded portion 164 formed in a bore 166 of the piston 20.

Axial movement of the piston 20 corresponds to rotation of the follow-up member 150 and vice versa. A torsion spring 170 is connected between the input shaft 62 and the follow-up member 150 by pins 174 and 176, respectively. During a power assisted steering maneuver, the valve core 80 is rotated relative to the valve sleeve 82, away from the neutral position. Thus, when the valve core 80 is rotated relative to the valve sleeve 82, the piston 20 moves axially. When the steering maneuver is terminated, the one-piece unit 158, and thus the valve sleeve 82, will rotate relative to the valve core 80 and return to the neutral position via the bias of the torsion spring 170.

Asymmetric flow path structure of the valve core 80 and the valve sleeve 82 is hereafter described. The valve sleeve 82 includes three axially extending lands 200 (FIG. 2) located radially opposite, in the neutral position, the grooves 116 of the valve core 80. The lands 200 each include an axially extending end face surface 202 which lies in an arc extending across the respective land 200 at a radius from the common axis 81. The lands 200 have relatively sharp terminus edges at the ends of the end face surfaces 202 adjacent the grooves 98 and 110, which define land corners. An associated one of the passages 94 extends through each land 200 and through each end face surface 202 to communicate with a respective one of the grooves 116.

The valve sleeve 82 also includes three axially extending lands 206 located radially opposite, in the neutral position, the grooves 122 of the valve core 80. The lands 206 each include an axially extending end face surface 208 which lies in an arc extending across the respective land 206 at a radius from the common axis 81. The lands 206 have relatively sharp terminus edges at the ends of the end face surfaces 208 adjacent the grooves 98 and 110, which define land corners.

The valve core 80 includes three axially extending lands 212 which are located radially opposite the grooves 98 in the neutral position. Each of the lands 212 has an axially extending end face surface 214 which lies in an arc extending partially across the respective land 212 at a radius from the common axis 81. Each of the lands 212 includes axially extending contoured portions 216 and 218. In a preferred embodiment, the contoured portions 216 and 218 are chamfers defined by planar surfaces. In alternative embodiments, the contoured portions 216 and 218 may include a plurality of planar surfaces and/or one or more curved segments. Hereinafter, the contoured portions 216 and 218 are referred to as chamfers 216 and 218, respectively, with the understanding that other contours are possible.

Each of the chamfers 216 is located between a respective one of the grooves 116 and a respective one of the end face surfaces 214. The flows of fluid past the three chamfers 216 are in fluid parallel relative to each other. Each of the chamfers 216 tapers radially inwardly as it extends from the respective end face surface 214 to the respective groove 116 and defines a land corner at its terminus edge adjacent the groove 116.

Each of the chamfers 218 is located between a respective one of the grooves 122 and a respective one of the end face surfaces 214. The flows of fluid past the three chamfers 218 are in fluid parallel with respect to each other. Each chamfer 218 tapers radially inwardly as it extends from the respective end face surface 214 to the respective groove 122 and defines a land corner at its terminus edge adjacent to the groove 122. The chamfers 216 have a steeper gradient than the chamfers 218. Thus, in the neutral position, each land corner at the chamfer 216 is spaced from the adjacent land corner on the land 200 a distance which is greater than a distance between the land corner at the chamfer 218 and the adjacent land corner on the land 206. Preferably, the magnitude of the gradient of the chamfer 216 is at least 1.2 times the magnitude of the gradient of the chamber 218. In a preferred embodiment, the magnitude of the gradient of the chamfer 216 is twice the magnitude of the gradient of the chamfer 218. In another preferred embodiment, the magnitude of the gradient of the chamfer 216 is 1.5 times the magnitude of the gradient of the chamfer 218.

The valve core 80 also includes three axially extending lands 222 which are positioned radially opposite the grooves 110 in the neutral position. Each of the lands 222 has an axially extending end face surface 224 which lies in an arc extending partially across the respective land 222 at a radius from the common axis 81. Each of the lands 222 includes axially extending contoured portions 226 and 228. In a preferred embodiment, the contoured portions 226 and 228 are chamfers defined by planar surfaces. In alternative embodiments, the contoured portions 226 and 228 may include a plurality of planar and/or one or more curved segments. Hereinafter, the contoured portions 226 and 228 are referred to as chamfers 226 and 228, respectively, with the understanding that other contours are possible.

Each of the chamfers 226 is located between a respective one of the grooves 116 and a respective one of the end face surfaces 224. The flows of fluid past the three chamfers 226 are in fluid parallel relative to each other. Each of the chamfers 226 tapers radially inwardly as it extends from the respective end face surface 224 to the respective groove 116 and defines a land corner at its terminus edge adjacent the groove 116.

Each of the chamfers 228 is located between a respective one of the grooves 122 and a respective one of the end face surfaces 224. The flows of fluid past the three chamfers 228 are in fluid parallel relative to each other. Each chamfer 228 tapers radially inward as it extends from the respective end face surface 224 to the respective groove 122 and defines a land corner at its terminus edge adjacent to the groove 122. The chamfer 226 has a steeper gradient than the chamfer 228. Thus, in the neutral position, the land corner at the chamfer 226 is spaced from the adjacent land corner on the land 200 a distance which is greater than a distance between the land corner at the chamfer 228 and the adjacent land corner on the land 206.

Preferably, the magnitude of the gradient of the chamfer 226 is at least 1.2 times the magnitude of the gradient of the chamfer 228. In a preferred embodiment, the magnitude of the gradient of the chamfer 226 is twice the magnitude of the gradient of the chamfer 228. In another preferred embodiment, the magnitude of the gradient of the chamfer 226 is 1.5 times the magnitude of the gradient of the chamfer 228. The gradients of the chamfers 216 and 226 are the same, and the gradients of the chamfers 218 and 228 are the same.

Figure 6:
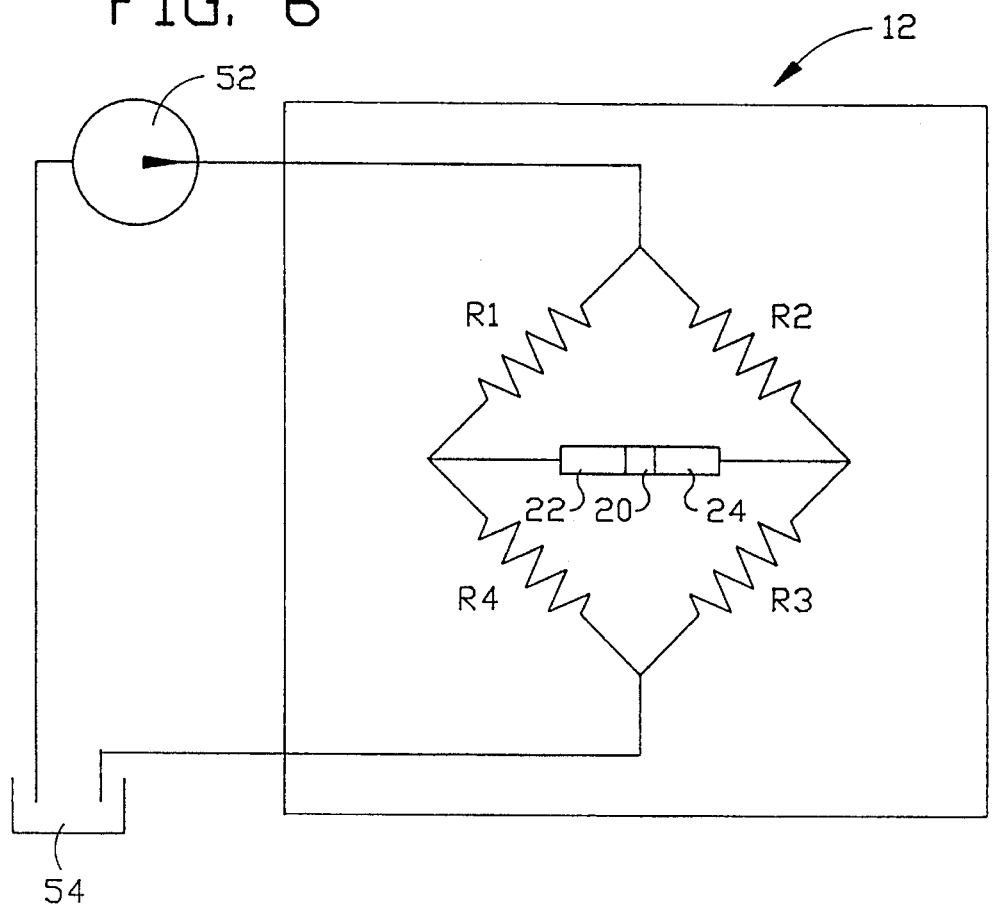
FIG. 6 is a schematic flow diagram of the valve of FIG. 1.

In operation, the amount of fluid flow from the grooves 116 to either the grooves 98 or 110 is dependent upon the proximity of the lands 212 and the lands 222 to the lands 200, due to relative rotation between the valve core 80 and the valve sleeve 82. The cooperation of the lands 200 and the lands 212 provides a variable resistance R1 (schematically represented in FIG. 6) to fluid flow, and the cooperation of the lands 200 and the lands 222 provides a variable resistance R2 to fluid flow. An increased resistance to fluid flow decreases a fluid volume flow rate.

Further, the amount of fluid flow from either the grooves 98 or 110 (FIG. 2) to the grooves 122 is dependent upon the proximity of the lands 212 and the lands 222 to the lands 206, due to relative rotation between the valve core 80 to the valve sleeve 82. The cooperation of the lands 206 and the lands 222 provides a variable resistance R3 (FIG. 6) to fluid flow and the cooperation of the lands 206 and the lands 212 provides a variable resistance R4 to fluid flow.

In the neutral position (FIG. 2) the lands 212 and the lands 222 are spaced at equal distances from the lands 200. Equal amounts of pressurized hydraulic fluid flows from the grooves 116 into both the grooves 98 and the grooves 110. Also, in the neutral position, the lands 212 and the lands 222 are spaced at equal distances from the lands 206. Equal amounts of hydraulic fluid flows from the grooves 98 and 110 into the grooves 122. Thus, in the neutral position, the pressures in the chamber portions 22 and 24 are equal. Therefore, the piston 20 is not moved.

Figure 3:
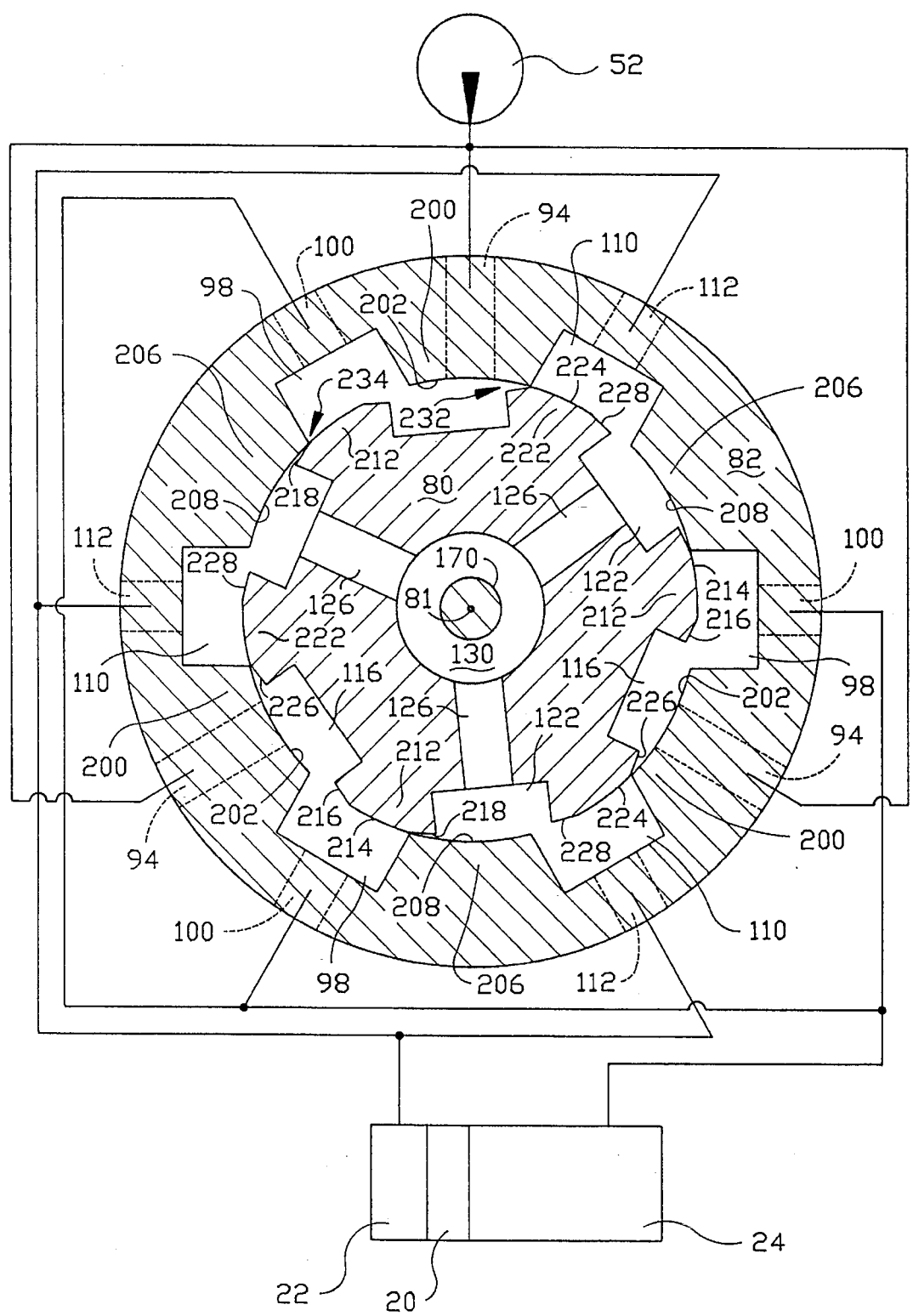
FIG. 3 is a view generally similar to FIG. 2, with valve members relatively rotated.

Upon rotation of the steering wheel for a power assisted steering maneuver, the valve core 80 is rotated relative to the valve sleeve 82, away from the neutral position. Upon rotation of the valve core 80 in a first direction (counterclockwise as shown in FIG. 3) relative to the valve sleeve 82, the lands 212 are spaced a greater distance from the lands 200 and the lands 222 are spaced a greater distance from the lands 206 than in the neutral position. The spacing of the lands 212 relative to the lands 200 and the spacing of the lands 222 relative to the lands 206 increases the respective areas available for fluid flow and reduces the respective resistance R1 and R3 (FIG. 6) to increase the flow of hydraulic fluid. Pressurized hydraulic fluid from the pump 52 is directed into the chamber 24. Also, hydraulic fluid from the chamber 22 is vented to the reservoir 54 to move the piston 20.

Figure 5:
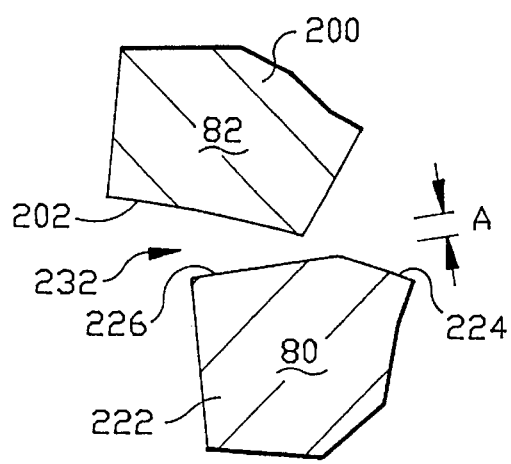
FIG. 5 is an enlargement of another portion of the view shown in FIG. 3.

Simultaneously, in the relatively rotated position (FIG. 3), the lands 222, at the chamfers 226, partially radially overlap the lands 200. The overlapping lands 222 and 200 define restrictive flow gaps or passages 232 for hydraulic fluid flowing from the grooves 116 to the grooves 110. Each flow gap 232 (enlarged, FIG. 5) has a cross-sectional area defined by the end face surface 202 of a respective one of the lands 200 and the chamfer 226 on a respective one of the lands 222. The cross-sectional area of each flow gap 232 for flow of hydraulic fluid from the grooves 116 to the grooves 110 gradually decreases to a minimum cross-sectional area A immediately adjacent to the groove 110. Thus, the flow gaps 232 are termed convergent flow gaps. During the radial overlap, the minimum cross-sectional area is defined by the terminus edge of the end face surface 202 and the chamfer 226.

Figure 4:
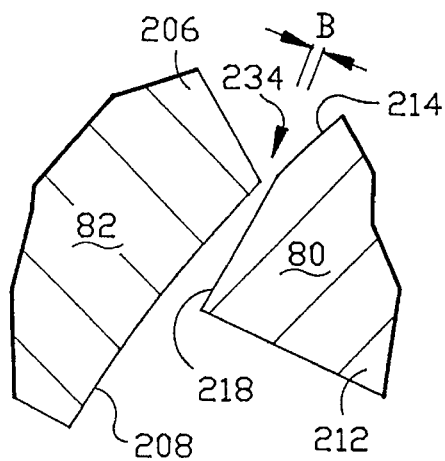
FIG. 4 is an enlargement of a portion of the view shown in FIG. 3.

Also, in the relatively rotated position (FIG. 3), the lands 212, at the chamfers 218, partially radially overlap the lands 206. The overlapping lands 212 and 206 create relative flow gaps or passages 234 for hydraulic fluid flowing from the grooves 98 to the grooves 122. Each flow gap 234 (enlarged, FIG. 4) has a cross-sectional area defined by the end face surface 208 on a respective one of the lands 206 and the chamfer 218 on a respective one of the lands 212.

The cross-sectional area of each flow gap 234 for flow of hydraulic fluid from the grooves 98 to the grooves 122 gradually increases from a minimum cross-sectional area B immediately adjacent to the groove 98. Thus, the flow gaps 234 are termed divergent flow gaps. During the radial overlap, the minimum cross-sectional area B is defined by the terminus edge of the end face surface 208 and the chamfered portion 218.

The minimum cross-sectional area A (FIG. 5) is larger than the minimum cross-sectional area B (FIG. 4) because of the larger gradient of the chamfer 226. As a result, the size of the minimum cross-sectional area A is at least 1.2 times the size of the minimum cross-sectional area B. In a preferred embodiment, the size of the minimum cross-sectional area A is twice the size of the minimum cross- sectional area B. In another preferred embodiment, the size of the minimum cross-sectional area A is 1.5 times the size of the minimum cross-sectional area B. The difference in size of the minimum cross-sectional areas, as defined by the land surfaces, is a regulation means for regulating fluid volume flow rates.

The overlapping of the lands 222 and 200 (FIG. 3) and the overlapping of the lands 212 and 206 decrease the respective flow areas and increase the respective resistances R2 and R4 (FIG. 6) to restrict the flow of hydraulic fluid. However, the resistance R2 is less than the resistance R4 because the gradient of the chamfer 226 is greater than the chamfer 218. Preferably, the difference is at least 1.2 times. In a preferred embodiment, the magnitude of the resistance R4 is twice the size of the magnitude of the resistance R2. In another preferred embodiment, the difference is 1.5 times. The fluid volume flow rate at the minimum cross-sectional area B is less than the fluid volume flow rate at the minimum cross-sectional area A. The difference is preferably at least 1.2 times, and in the preferred embodiments the difference is 1.5 and 2 times, respectively. Less overall flow noise is created because the larger minimum cross-sectional area A is at a convergent flow gap and the smaller minimum cross-sectional area B is at a divergent flow gap.

Upon rotation of the valve core 80 (FIG. 2) in a second direction (clockwise, not shown) relative to the valve sleeve 82, there is a corollary restriction of flow of hydraulic fluid from the grooves 116 to the groove 98 and from the grooves 110 to the grooves 122. With the valve core 80 and the valve sleeve 82 in such a relatively rotated position, the lands 222 radially overlap the lands 206 and the lands 212 radially overlap the lands 200. Thus, associated restrictive flow gaps are established between the lands 222 and 206 and the lands 212 and 200.

Thus, pressurized hydraulic fluid from the fluid supply pump 52 (FIG. 1) is directed into the chamber 22. Hydraulic fluid from the chamber 24 is vented to the reservoir 54. However, here also, the minimum cross-sectional area at convergent flow gaps is larger than the minimum cross-sectional area at divergent flow gaps, preferably at least 1.2 times as large. Thus, the fluid volume flow rate is larger at the convergent flow gaps, and less overall noise is created.

From the above description of the invention, those skilled in the art will perceive improvements, changes and modifications. Such improvements, changes and modifications within the skill of the art are intended to be covered by the appended claims.

Having described the invention, the following is claimed:

1. A valve for controlling flow of hydraulic fluid, said valve comprising:

first and second valve members having a plurality of lands and grooves;

said valve members being relatively movable from a neutral position to a displaced position in which surface segments of respective pairs of lands overlap to form flow gaps for restricting flow of fluid between respective pairs of grooves;

at least one of said flow gaps being divergent by having a cross-sectional flow area which increases along a direction of fluid flow and at least one of said flow gaps being convergent by having a cross-sectional flow area which decreases along a direction of fluid flow; and said flow gaps having minimum cross-sectional flow areas defined by said surface segments, said flow gaps being sized such that said minimum cross-sectional flow area of said convergent flow gap is larger than said minimum cross-sectional flow area of said divergent flow gap for suppressing valve noise.

2. A valve as set forth in claim 1, wherein a fluid volume flow rate for said convergent flow gap is greater than a fluid volume flow rate for said divergent flow gap.

3. A valve as set forth in claim 2, wherein the magnitude of the fluid volume flow rate for said convergent flow gap is at least 1.2 times the magnitude of the fluid volume flow rate for said divergent flow gap.

4. A valve as set forth in claim 3, wherein the magnitude of the fluid volume flow rate for said convergent flow gap is on the order of twice the magnitude of the fluid volume flow rate for said divergent flow gap.

5. A valve as set forth in claim 1, wherein said surface segments of said respective pairs of lands includes a contoured portion.

6. A valve as set forth in claim 5, wherein said contoured portion has a planar surface.

7. A valve as set forth in claim 1, including first and second passage means for connection with first and second locations in a fluid utilization device, supply passage means for connection with a fluid supply and a return passage means for connection with a fluid reservoir, said convergent flow gap being located downstream of said supply passage means and upstream of said second passage means relative to flow through said convergent flow gap, said divergent flow gap being located upstream of said return passage means and downstream of said first passage means relative to flow through said divergent flow gap.

8. A valve as set forth in claim 7, wherein said first and second valve members are a valve sleeve and a valve core, said convergent flow gap restricts flow of fluid from a groove on said valve core to a groove on said valve sleeve, said divergent flow gap restricts flow of fluid from a groove on said valve sleeve to a groove on said valve core.

9. A valve as set forth in claim 1, wherein said first and second valve members are a valve sleeve and a valve core, said valve core being rotatable relative to said valve sleeve about a common axis, said surface segments include a planar chamfer surface on said valve core for each of said flow gaps.

10. A valve as set forth in claim 1, wherein said minimum cross-sectional flow area of said convergent flow gap is at least 1.2 times the size of said minimum cross-sectional area of said divergent flow gap.

11. A valve for controlling flow of hydraulic fluid, said valve comprising:

first and second valve members having a plurality of lands and grooves;

said valve members being relatively movable from a neutral position to a displaced position in which surface segments of respective pairs of lands overlap to form flow gaps for restricting flow of fluid between respective pairs of grooves;

at least one of said flow gaps being divergent by having a cross-sectional flow area which increases along a direction of fluid flow therethrough and at least one of said flow gaps being convergent by having a cross-sectional flow area which decreases along a direction of fluid flow therethrough; and regulation means for regulating a fluid volume flow rate through said divergent flow gap and for regulating a fluid volume flow rate through said convergent flow gap such that the fluid volume flow rate through said convergent flow gap is greater than the fluid volume flow rate through said divergent flow gap for suppressing valve noise.

12. A valve as set forth in claim 11, wherein each of said flow gaps have a minimum cross-sectional flow area, said minimum cross-sectional flow area of said convergent flow gap being larger than said minimum cross-sectional flow area of said divergent flow gap.

13. A valve as set forth in claim 11, wherein said regulation means includes means for positioning said surface segments of said respective pairs of lands at a spaced distance to restrict fluid flow through the associated flow gap formed by said surface segments of said respective pairs of lands.

14. A valve as set forth in claim 11, wherein said regulation means regulates the fluid volume flow rates through said convergent flow gap and said divergent flow gap such that the fluid volume flow rate through said convergent flow gap is at least 1.2 times the magnitude of the fluid volume flow rate through said divergent flow gap.

15. A valve core as set forth in claim 14, wherein said regulation means regulates the fluid volume flow rates through said convergent flow gap and said divergent flow gap such that the fluid volume flow rate through said convergent flow gap is on the order of twice the magnitude of the fluid volume flow rate through said divergent flow gap.

16. A valve as set forth in claim 14, wherein said regulation means regulates the fluid volume flow rates through said convergent flow gap and said divergent flow gap such that the fluid volume flow rate through said convergent flow gap is on the order of 1.5 times the magnitude of the fluid volume flow rate through said divergent flow gap.

17. A valve as set forth in claim 11, including first and second passage means for connection with first and second locations in a fluid utilization device, supply passage means for connection with a fluid supply and return passage means for connection with a fluid reservoir, said convergent flow gap being located downstream of said supply passage means and upstream of said second passage means relative to flow through said convergent flow gap, said divergent flow gap being located downstream of said first passage means and upstream of said return passage means relative to flow through said divergent flow gap.

18. A valve as set forth in claim 11, wherein said first and second valve members are a valve sleeve and a valve core, said convergent flow gap restricts flow of fluid from a groove on said valve core to a groove on said valve sleeve, said divergent flow gap restricts flow of fluid from a groove on said valve sleeve to a groove on said valve core.

19. A valve as set forth in claim 11, wherein said surface segments of said respective pairs of lands includes a contoured portion.

20. A valve as set forth in claim 11, wherein said minimum cross-sectional flow area for each of said gaps varies during relative movement of said valve members for a range of positions in which said surface segments of respective pairs of lands overlap.

* * * * *